Figure 1:
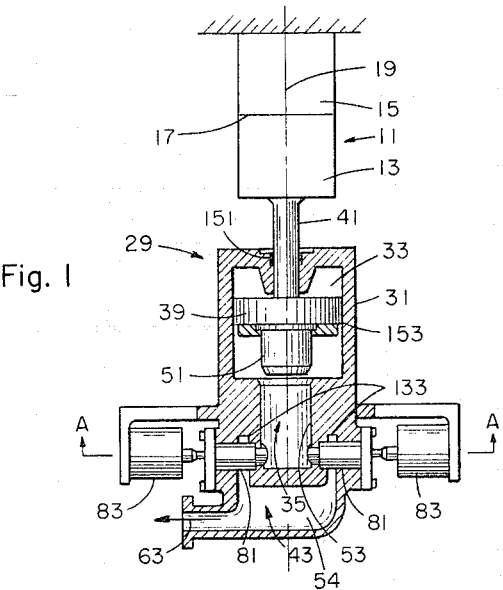

Nov. 29, 1966　　　K. POLLAK　　　3,288,682
HYDRO-PNEUMATIC APPARATUS FOR CHANGING CRITICAL
CONFIGURATION OF NUCLEAR FUEL MASS
Filed Aug. 10, 1964

INVENTOR.
KURT POLLAK
BY

United States Patent Office 3,288,682
Patented Nov. 29, 1966

3,288,682
HYDRO-PNEUMATIC APPARATUS FOR CHANGING CRITICAL CONFIGURATION OF NUCLEAR FUEL MASS
Kurt Pollak, Havertown, Pa., assignor to the United States of America as represented by the United States Atomic Energy Commission
Filed Aug. 10, 1964, Ser. No. 388,738
5 Claims. (Cl. 176—28)

This invention relates to nuclear energy and more particularly to disrupting a heavy nuclear fuel mass configuration.

In the field of nuclear energy a need exists for apparatus capable of splitting a large nuclear fuel mass configuration into two halves. These halves, which are normally held adjacent to each other in a heavy combined configuration, must be selectively and automatically split apart in a safe, trouble-free manner in a sufficiently short time interval to prevent a fatal build-up of criticality.

It is an object of this invention, therefore, to provide a safe, trouble-free and practical apparauts for the fast disruption of a heavy nuclear fuel mass;

It is another object automatically and selectively to disrupt a nuclear fuel mass to prevent a fatal build-up of criticality;

It is another object to provide improved nuclear safety apparatus;

It is another object to provide the splitting of a heavy nuclear fuel mass into two halves;

It is another object to provide means for combining and disrupting two nuclear fuel mass configurations;

It is another object to provide means responsive to the increase in size of a nuclear fuel mass configuration for splitting the mass in two;

It is another object to provide multiple valve assemblies arranged for parallel but independent action;

It is another object to provide valves triggered by pilot valves held closed by normally energized and, therefore, failure-proof solenoids, electronically equipped for ultra fast action without hysteresis or motion caused restraining forces;

It is another object to provide for the deflection of dump shock waves from flow interference by shaped annular guide walls;

It is still another object to provide an improved valve construction combination.

The foregoing objects are achieved by normally holding the masses adjacent and separating them with a compressed gas containing liquid body under pressure that is selectively, automatically and explosively released by pilot valves at ultra-fast speed to expand said gas to separate said masses. These pilot valves are selectively operated in a short time by electrical means, automatically actuated by a dimensional expansion of said masses and act independently in parallel while preventing dump shock wave flow interference by dividing the released fluid body into a plurality of small, equal streams with separation means for further splitting and direction by streamlined impaction means. By properly shaping the stream separation and impaction means the exploding fluid can be dumped into an outlet in a short time (less than 6 milliseconds) for expanding said gas for moving said masses relatively to avoid a fatal build-up of criticality in the combined fuel mass configuration.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

Figure 2:
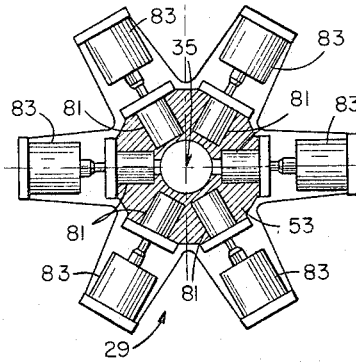
Figure 5:
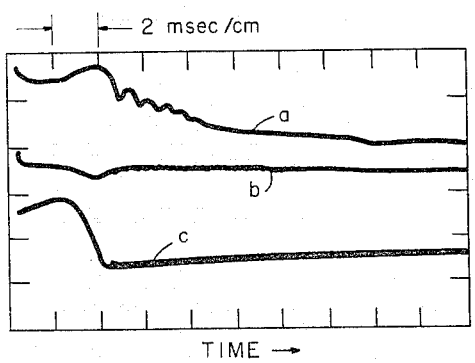
Figure 4:
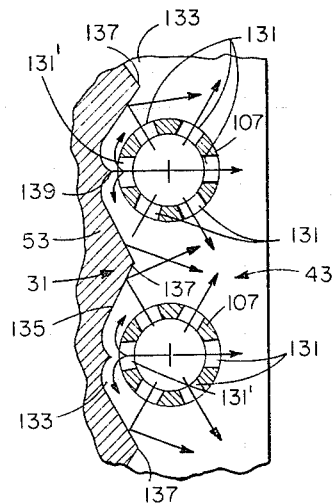
Figure 3:
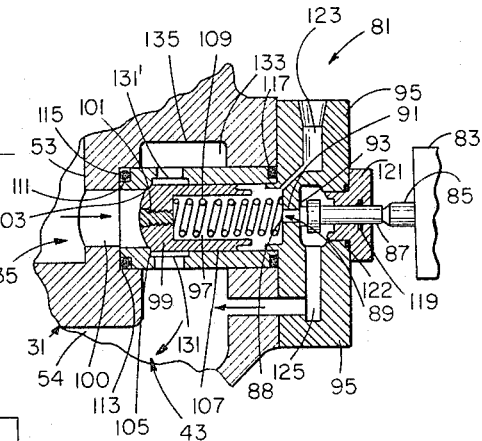

In the drawings where like parts are marked alike:
FIG. 1 is a partial cross-section of the apparatus of this invention;
FIG. 2 is a partial cross-section of FIG. 1 through A—A;
FIG. 3 is a partial enlarged view of the dump valve of FIG. 1;
FIG. 4 is a partial cross-section corresponding to the impact surface area of FIG. 3;
FIG. 5 is a graphic illustration of a typical oscilloscope test trace showing (a) solenoid current vs. time, (b) motion of pilot valve plunger vs. time and (c) pressure change vs. time for the fluid dumped by said pilot valve.

Referring to FIG. 1, the critical configuration of the fuel mass 11 is held in two sections 13 and 15, which meet in a plane along line 17 normal to axis 19 of mass 11. These sections are split apart relatively-oppositely from this plane along line 17.

A hydraulically controlled pneumatic operator 29 positions and separates these sections. This operator 29, comprises cylinder 31 containing in a single chamber portion 33 thereof a highly compressed gas, such as nitrogen, and in a single chamber portion 35 thereof a hydraulic liquid body of oil, which holds the gas in its compressed state. A piston 39 in this cylinder separates the gas from the liquid in cylinder 31. An attached piston rod 41 on this piston 39, connects with the movable half 13 of the fuel mass 11 normally to hold the split fuel mass sections 13 and 15 together in their critical configuration.

Should the oil in cylinder portion 35 be released by draining it from cylinder 35 through vent pipe 43 to an atmospheric vented reservoir (not shown), the compressed gas in cylinder portion 33 biases the piston 39, its rod 41, and fuel section 13 away from fuel section 15 in a power stroke to separate or split apart the fuel sections 13 and 15 into a non-critical configuration. The initial movement of piston 39 is very rapid but the reduced nose end 51 of piston 39 enters constricted cylinder portion 53 at the end of this power stroke to provide a slow down throttle for the end of this power stroke. Advantageously, vent 43 forms a chamber 54 having a ring shaped manifold groove into the inside diameter of which all the pilot valves 81 open in parallel so that the single outlet 63 rapidly drains the vent to the reservoir (not shown).

The pilot valves 81, which accomplish the ultrafast drainage of hydraulic liquid from cylinder portion 35 are the subject of this invention in context with the described function and arrangement. In order to make the drainage action foolproof, a plurality of parallel acting, independent, identical valves 81 are provided in an annual array around cylinder portion 53, as shown in FIG. 2, which open together in parallel symmetrically to vent 43. Each valve 81 has a solenoid 83 and these solenoids are connected from a single uniform energy source in parallel through a single electrical switch for selectively energizing and deenergizing all the solenoids at once. For ease of explanation, one valve 81 and its respective solenoid 83 are described, but each valve-solenoid assembly is identical with all the other valve-solenoid combinations.

Referring now to FIG. 3, normally energized, constant current, electromagnetic, release solenoid 83 holds hydraulic pilot valve 81 selectively closed. To this end, the coil (not shown) of solenoid 83, when uniformly energized, pushes its plunger 85 against intermediate, finger, control-rod 87 to hold this control rod 87 in the holding or sealing position shown in FIG. 3. In this position the outside of this rod 87 is held in hole 89 against oil pressure at end 88 of control rod 87 in sealing relation with the inside 91 and end 93 of hole 89 in removable extension 95 of cylinder 31. This selectively maintains the oil pressurization in chamber 35 and in chamber 97 of piston 99 of valve 81 by permitting oil from main chamber 35 of valve 29 to pass through six equal holes 100 and orifice 101 in piston poppet 99. The solenoid on finger control rod 87 need only be small since the force of the oil in chamber 97 through piston 99 presses on only a small area of finger control rod 87 at the inside of hole 89 and at its hole end 93.

The pressure in chamber 97 tends to balance the force of the oil in chamber 35 selectively to require only a small seating force for seating surface 103 of piston 99 against its seat 105 in annular cylindrical shaped fitting 107. To this end piston 99 is slightly larger in diameter than hole 100 so that oil from chamber 35 pushes a slightly smaller area out to unseat piston 99 than is for seating this piston. Spring 109 in chamber 97 provides a small positive sealing force in addition to the small hydraulic seating force across piston 99 for holding the dished seating surface 103 of piston 99 in conforming sealing contact with seat 105 of fitting 107. This total closing force on piston 99 to close hole 100 in valve 81 initially holds this hole 100 close to confine the liquid and gas under pressure in operating cylinder 31 and to block the flow of oil from chamber 35 into vent 43. However, this differential force holding the pilot valve 81 closed is kept at a minimum, so that any intensification of the oil pressure in the cylinder 31 due to expanding fuel mass 11 will force the piston 99 open and thus "scram" the cylinder 31 automatically without any separate electrical signal or signal interruption.

The fitting 107 reduces slightly the area against which oil from chamber 35 could otherwise push to unseat piston poppet 99. It will be seen that this fitting has an O-ring groove 111 having an O-ring seal 113 that seats against surface 115 of constricted oil containing portion 53 of cylinder 31 when valve 81 is closed to prevent the release of oil pressure from out of main oil chamber 35. Fitting 107 holds an O-ring seal 117 against cylinder 31, at the opposite end from O-ring 113, and the outside diameter of finger control rod 87 movably seats against seal 119 in plug 121, which is held in removable piece or extension 95 of cylinder 31 by suitable holding means (not shown). One such holding means, comprises bolts threaded through this removable piece 95 into the main portion of cylinder 31. Seal 122 seals plug 121 against extension 95.

This removable piece 95 contains restricted fill connection 123 for main oil chamber 97 of valve 81. Connected in this small connection 123, is a suitable normally closed valve (not shown), which communicates oil from a suitable reservoir connected to channel 123 through cavity 97 and orifice 101 of piston 99 to chamber 35. A constantly operating hydraulic pressure source (not shown) thus replaces small leakages across the O.D. of pilot valve piston 99 through channel 123.

Solenoid 83 deenergizes to release the restraining force on control rod 87 for permitting the oil pressure in cavity 97 in piston 99 to force the control rod 87 out of sealing contact with the inside of hole 89 and the end 93 of hole 89 in member 95. This quickly dumps oil from cavity 97 through hole 89 and bleed channel 125 into vent 43 thus causing a large unseating pressure differential on plunger 99 that instantaneously moves the plunger 99 coaxially with the axis of hole 100 to unseat the plunger 99 from its seat 105. This simultaneously dumps oil pressure in main chamber 35 by means of flow through openings 131 in fitting 107 into vent 43, outlet 63 and its atmospheric vented receiver. This results in the sudden release of oil pressure in chamber 35 thus causing the gas pressure in chamber 33 to bias main piston 39 to separate sections 13 and 15 of fuel mass 11.

Referring ot FIG. 4, in a practical arrangement for accomplishing the required super fast dumping of oil in accordance with the described system, a uniform annular array of six equal holes 131 are provided in fitting 107 with uniform cross-sections whose axes converge on the axes of hole 100 and piston 99 at right angles to the axis of hole 100 and piston 99. These holes 131 form an annular array of equal smaller streams by separation for guiding the fluid oil into vent 43 and its communicating annular groove or manifold 133, which also communicates with adjacent fittings 107, whereby all the pistons 99 dump the oil from chamber 35 simultaneously in common in a foolproof manner. Groove 133 and vent 43 thus receive the fluid around 360° of the circumference of each piston 99 and fitting 107.

The wall 135 of groove 133, against which pistons 99 dump part of the oil from chamber 35, have corresponding major ridges 137 symmetrically disposed between the adjacent fittings 107. Also, wall 135 between these ridges 137, forms minor ridges 139 less than half as high as the major ridges. Each of these minor ridges 139 is located along the axis of one of the holes 131 i.e. holes 131'. These minor ridges 139 each split the stream of oil formed by its adjacent hole 131' into two equal, small energy streams, together having $\frac{1}{36}$ the energy of the streams through holes 100. The wall 135 between ridges 137 and 139 is streamlined to deflect the flow from holes 131' to prevent any two streams from any holes 131 from impacting directly oppositely against each other. This streamlined wall and its ridges function to cause the shock waves from the impact of the streams against wall 135 to be small and to reflect from groove 133 into the main chamber 54 of vent 43 for absorption and not against the dump passages 131. Thus the flow of the dumped oil is not hindered by shock waves.

The flow of the dumped liquid being unhindered by shock wave effects, the main liquid volume in the operating cylinder reduces explosively as the compressed gas expands with consequent movement of the piston within the cylinder. The explosive maximum release of the compressed gas energy provides a powerful force in the compressed gas that makes it thus possible to move the heavy fuel mass and the operating piston with connecting elements in a sufficiently short time to prevent a fatal buildup of criticality in the combined fuel mass configuration.

In operation, when a fast separation of the critical fuel mass configuration is desired, an electronic switch de-energizes all the release solenoids 83 in parallel and results in fast action at a speed of approximately 2 msec., as shown in FIG. 5, where $a$ represents the current in solenoid 83 vs. time, line $b$ represents the distance of motion vs. time of the piston 87 as the current solenoid 83 is reduced, and line $c$ represents the change in pressure vs. time on the chamber 35 side of piston 99 as the result of the movement of piston 99. One suitable electrical switch is the switch described and shown in U.S. Patent 3,104,295 to M. Bender et al. but other suitable switches may be used. With the release of the holding force of the release solenoids, the pressure on each pilot valve 81 moves the pilot valve plunger 99 at ultrafast speeds in one direction and opens the high pressure volume above the valve 81 to atmospheric pressure. By reenergizing solenoid 83, control rod 87 reseats itself in hole 89. Pressurized oil is introduced into chamber 97 to close valve 81. Then oil from a suitable reservoir is reintroduced into chamber 35 to move piston 39 to push the fuel sections 13 and 15 together in a closed cycle. This also compresses the gas in chamber 33 for the beginning of another sequence as described above.

Also, it will be seen that any failure in the electromagnetic system of solenoids 83 removes the positive force on piston 99 and this permits the oil pressure in chamber 35 to bias plunger 99 to release this pressure. Additionally, the pressure of this solenoid rod 85 and of the spring 109 just barely balance the fluid pressure in chamber 35. Thus an expansion in fuel mass 11 will increase the fluid pressure in chamber 35 and overcome the seating force of the solenoid 83 and spring 109 thereby immediately to release the fluid from chamber 35 and to scram operator 29 so as to separate the fuel sections 13 and 15 into a noncritical configuration.

Normally, the nitrogen pressure in chamber 33 remains for long periods of time without leaking past seal 151 around shaft 41 to the atmosphere or past piston seal 153 into chamber 35 because there is normally equal pressure on both sides of piston 39 which tends to prevent leakage of gas past piston 39 from chamber 33 to chamber 35. Suitable positive seals are used to this end for seals 151 and 153. Normally, therefore, these seals and the different viscosities of the oil and gas prevent leakage into chamber 35, however, make up gas pressure may be supplied from a suitable source to chamber 33. Even if some gas in chamber 35, this gas in chamber 35 is explosively released with the fluid in chamber 35 thus to produce a pressure differential across piston 39 with a low pressure in chamber 35 whereby the piston 39 rapidly separates fuel sections 13 and 15 as required.

This invention has the advantage of providing safe, fool-proof and practical hydro-pneumatic apparatus with internal control for the fast, powerful disruption of a heavy nuclear fuel mass. This apparatus also has the advantage of automatic operation in response to an increase in the size of the fuel and selective fast operation. Actual tests, for example, have shown this invention to be operable in 2 msec. Also, this invention provides fast acting hydro-pneumatic valves in operable association with pilot valves that explosively release hydraulic fluid so as to prevent dump shock waves from flow interference. Additionally, this invention has the advantage of dividing a single body of fluid into an annular array of equal streams that are further divided in part by impaction for suitable reflection and absorption of their shock waves and flow into a single outlet stream.

What is claimed is:

1. In combination with a hydro-pneumatic device that holds a hydraulic fluid under pressure for pressurizing a gas for holding a nuclear fuel mass in a critical configuration, a pilot valve for explosively releasing said hydraulic fluid quickly to permit said gas to expand to separate said nuclear fuel mass into equal noncritical configuration, comprising a plurality of plungers that are loaded across said plungers for preventing the release of said hydraulic fluid having means for rapidly producing a large pressure differential across said plungers for biasing said plungers explosively to release said fluid under pressure, and means for directing said exploding fluid in a plurality of streams to reduce impedance to said release while shaping said flow to prevent shock waves from flow interference whereby said fuel mass is separated in a short time to prevent a fatal buildup of criticality.

2. The invention of claim 1 in which said means for producing said pressure differential, consists of means for selectively releasing oil in one side of said plungers for producing an unbalance in said plunger which causes said plunger to move in response to said pressure differential.

3. The invention of claim 2 in which said pressure differential is responsive to increase in said fluid pressure due to the expansion of said fuel mass automatically to release said fluid pressure explosively.

4. The invention of claim 1 in which said plungers have sleeves forming uniform cross-section holes for forming and directing fluid streams, and said sleeves have common communicating low impedance means for dumping said streams suddenly in parallel and in common with each other.

5. The invention of claim 1 in which said means for directing said exploding fluid includes a cylindrical sleeve for mating with said plunger to hold back the release of said oil pressure, said sleeve forming an annual array of holes which said plunger uncovers to communicate with said oil pressure for the flow of said fluid in streams therethrough, and streamlined means for receiving said streams of fluid for dividing at least one of said streams into a plurality of smaller streams and directing them away from said other streams.

References Cited by the Examiner

UNITED STATES PATENTS

| 2,987,050 | 6/1961 | Oppenheimer et al. | 91—459 |
| 3,033,171 | 5/1962 | Engelbrecht et al. | 91—459 |
| 3,180,799 | 4/1965 | Blake | 176—28 |
| 3,188,276 | 6/1965 | Aranovitch et al. | 176—28 |

FOREIGN PATENTS 621,190    5/1961    Canada.

L. DEWAYNE RUTLEDGE, *Primary Examiner.*

H. E. BEHREND, *Assistant Examiner.*